(12) United States Patent
Servi et al.

(10) Patent No.: US 9,015,089 B2
(45) Date of Patent: Apr. 21, 2015

(54) IDENTIFYING AND FORECASTING SHIFTS IN THE MOOD OF SOCIAL MEDIA USERS

(71) Applicant: The MITRE Corporation, McLean, VA (US)

(72) Inventors: Leslie David Servi, Lincoln, MA (US); Sara Beth Elson, Olney, MD (US)

(73) Assignee: The MITRE Corporation, McLean, VA (US)

( * ) Notice: Subject to any disclaimer, the term of this patent is extended or adjusted under 35 U.S.C. 154(b) by 310 days.

(21) Appl. No.: 13/750,230

(22) Filed: Jan. 25, 2013

(65) Prior Publication Data
US 2013/0275352 A1 Oct. 17, 2013

Related U.S. Application Data

(60) Provisional application No. 61/625,309, filed on Apr. 17, 2012.

(51) Int. Cl.
| | |
|---|---|
| *G06E 1/00* | (2006.01) |
| *G06E 3/00* | (2006.01) |
| *G06F 15/18* | (2006.01) |
| *G06G 7/00* | (2006.01) |
| *G06N 3/08* | (2006.01) |
| *G06Q 10/00* | (2012.01) |

(52) U.S. Cl.
CPC . *G06N 3/08* (2013.01); *G06Q 10/00* (2013.01)

(58) Field of Classification Search
None
See application file for complete search history.

(56) References Cited

U.S. PATENT DOCUMENTS

| 7,979,369 B2 | 7/2011 | Grenier et al. |
| 8,136,034 B2 * | 3/2012 | Stanton et al. ................ 715/255 |

(Continued)

OTHER PUBLICATIONS

Modeling Public Mood and Emotion: Twitter Sentiment and Socio-Economic Phenomena Johan Bollen School of Informatics and Computing Indiana University Huina Mao School of Informatics and Computing Indiana University Alberto Pepe Center for Astrophysics Harvard University Copyright c 2011, Association for the Advancement of ArtificialIntelligen.*

(Continued)

*Primary Examiner* — Kakali Chaki
*Assistant Examiner* — Ababacar Seck
(74) *Attorney, Agent, or Firm* — Sterne Kessler Goldstein & Fox P.L.L.C.

(57) ABSTRACT

Quantitatively identifying and forecasting shifts in a mood of social media users is described. An example method includes categorizing the textual messages generated from the social media users over a selected period of time into a plurality of word categories, with each word category containing a set of words associated with the mood of social media users. A score indicating an intensity of the mood of the social media users is calculated for each word category, wherein a value of the score and its corresponding time point define a data point for the word category. Subsequently, breakpoints in the mood of social media users are determined so that the breakpoints minimize a sum of square errors representing a measurement of a consistency of all data points from inferred values of the scores of the data points derived using the breakpoints over the selected period of time. Further, space of all possible breakpoints for the word categories are searched to identify a defined number and locations of the breakpoints. Finally the breakpoints over the selected period of time are interpreted to identify the shifts in the mood of social media users and trends between breakpoints.

34 Claims, 12 Drawing Sheets
(8 of 12 Drawing Sheet(s) Filed in Color)

(56) References Cited

U.S. PATENT DOCUMENTS

| | | | |
|---|---|---|---|
| 8,504,550 B2 | 8/2013 | Hall et al. | |
| 2010/0293170 A1* | 11/2010 | Hall et al. | 707/750 |
| 2011/0131279 A1 | 6/2011 | Karnik | |
| 2011/0231416 A1* | 9/2011 | Goodchild Drake | 707/754 |

OTHER PUBLICATIONS

A Hybrid Mood Classification Approach for Blog Text—Springer-Verlag Berlin Heidelberg 2006 Yuchul Jung, Hogun Park, and Sung Hyon Myaeng* School of Engineering, Information and Communications University, South Korea 119, Munjiro, Yuseong-gu, Daejeon, 305-732, Korea.*

International Search Report dated Jul. 31, 2013 in International Application No. PCT/US2013/036984, filed Apr. 17, 2013, 2 pages.

Les Servi et al., "A Mathematical Approach to Identifying and Forcasting Shifts in the Mood of Social Media Users", Mar. 2012, pp. 27-1 27-16, accessed at http://www.mitre.org/publications/technical-papers/a-mathematical-approach-to-identifying-and-forecasting-shifts-in-the-mood-of-social-media-users.

Les Servi, "Analyzing Social Media Data Having Discontinuous Underlying Dynamics", Nov. 2013, Operations Research Letters, vol. 41 Issue 6, pp. 581-585.

* cited by examiner

IDENTIFYING AND FORECASTING SHIFTS IN THE MOOD OF SOCIAL MEDIA USERS

BACKGROUND

1. Field

The embodiments generally relate to identifying mood shifts and trends of social media users in a computing environment.

2. Background Art

Social media offers opportunity to identify and understand the moods of people using these platforms. The rapidly growing number of social media users around the world creates a wealth of data that complements traditional public-opinion polls and other types of surveys. For example, social media like Facebook and Twitter can reveal what people are thinking and feeling about current events.

Some attempts have been made to analyze this new dataset and to characterize the mood of social media users. However, such conventional methods are based on the inputs of human subject matter experts, which are highly qualitative. As a result, they fail to provide an ideal quantitative technique to identify mood shifts and forecast trends with adequate scientific rigor and objectivity.

BRIEF SUMMARY

Embodiments relate to quantitatively identifying and forecasting shifts in a mood of social media users. In an embodiment, textual messages generated from the social media users over a selected period of time are categorized into a plurality of word categories, with each word category containing a set of words associated with the mood of social media users. A score indicating an intensity of the mood of the social media users is calculated for each word category. Accordingly, a value of the score and its corresponding time point define a data point for the word category. Subsequently, breakpoints in the mood of social media users are determined, so that the breakpoints minimize a sum of square errors representing a measurement of a consistency of all data point from inferred values of the scores of the data points derived using the breakpoints over the selected period of time. Further, space of all possible breakpoints for the word categories are objectively searched to identify a defined number and locations of the breakpoints. Finally, the breakpoints over the selected period of time are interpreted to identify the shifts in the mood of social media users.

In another embodiment, a system for quantitatively identifying shifts in a mood of social media users includes a message categorizer, configured to categorize textual messages generated from the social media users over a selected period of time into a plurality of word categories, with each word category containing a set of words associated with the mood of social media users. The system also includes a score calculator, configured to, for each word category, calculate a score indicating an intensity of the mood of the social media users and a value of the score and its corresponding time point define a data point for the word category. The system further includes a breakpoint determinator, configured to determine breakpoints in the mood of social media users, so that the breakpoints minimize a sum of square errors representing a measurement of a consistency of all data point from inferred values of the scores of the data points derived using the breakpoints over the selected period of time. Furthermore, the space of all possible breakpoints for the plurality of word categories are searched to identify an optimal number and locations of the breakpoints. Finally, the system includes a breakpoint interpreter, configured to interpret the breakpoints over the selected period of time to identify the shifts in the mood of social media users.

Embodiments may be implemented using hardware, firmware, software, or a combination thereof and may be implemented in one or more computer systems or other processing systems.

Further embodiments, features, and advantages of embodiments of the present invention, as well as the structure and operation of the various embodiments, are described in detail below with reference to the accompanying drawings. It is noted that the invention is not limited to the specific embodiments described in this application. Such embodiments are presented for illustrative purposes only. Additional embodiments will be apparent to persons skilled in the relevant art(s) based on the information contained in this document.

BRIEF DESCRIPTION OF THE DRAWINGS/FIGURES

The patent or application file contains at least one drawing executed in color. Copies of this patent or patent application publication with color drawings will be provided by the U.S. Patent and Trademark Office upon request and payment of the necessary fee. Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

Figure 10A:
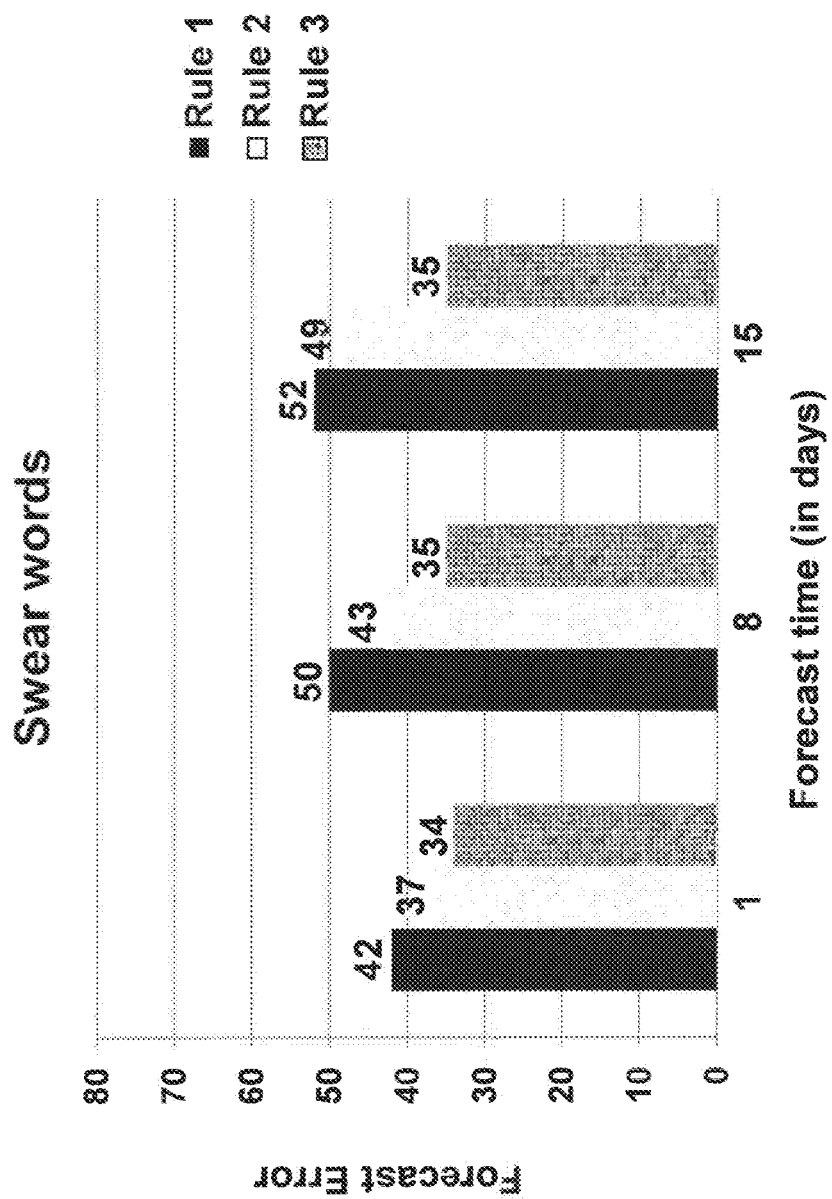
Figure 10B:
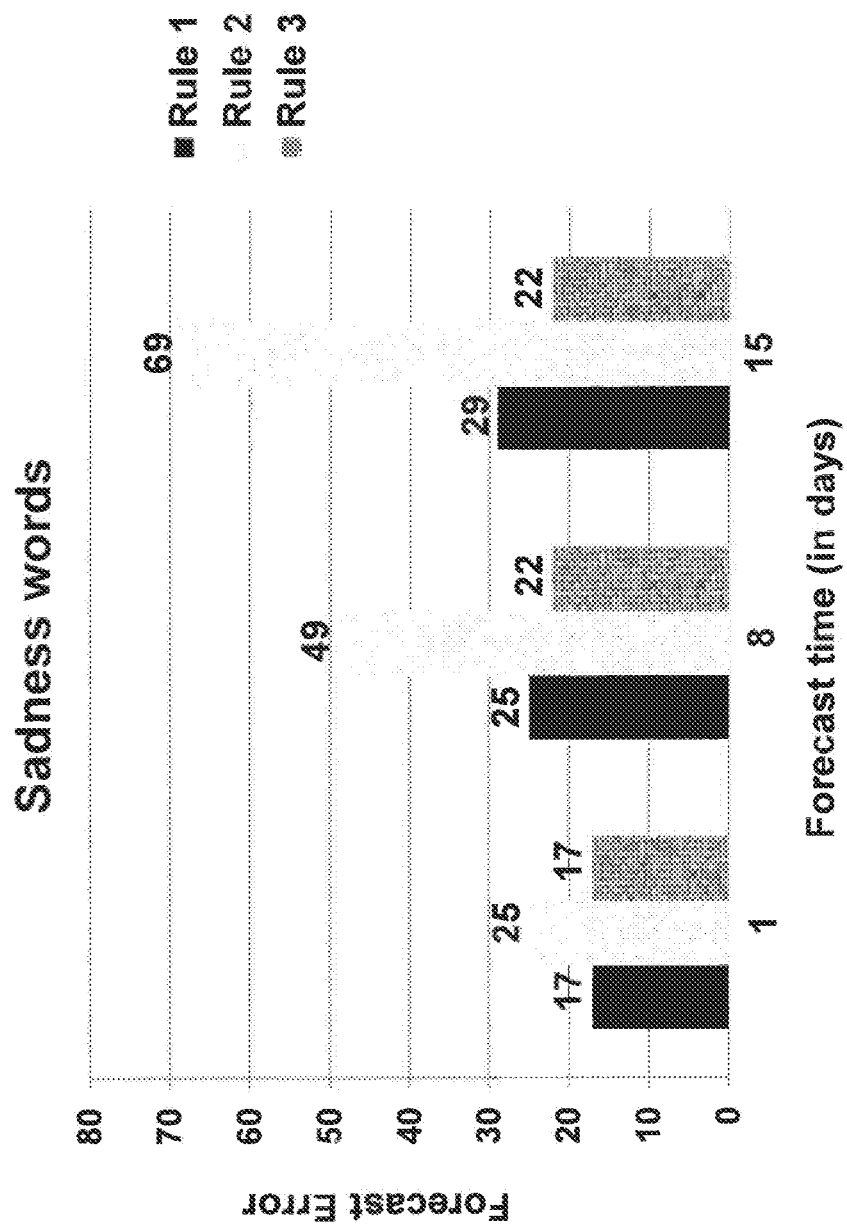

FIGS. 10A-B illustrate forecast errors in predicting sadness and swear daily data, according to an embodiment.

Figure 11:
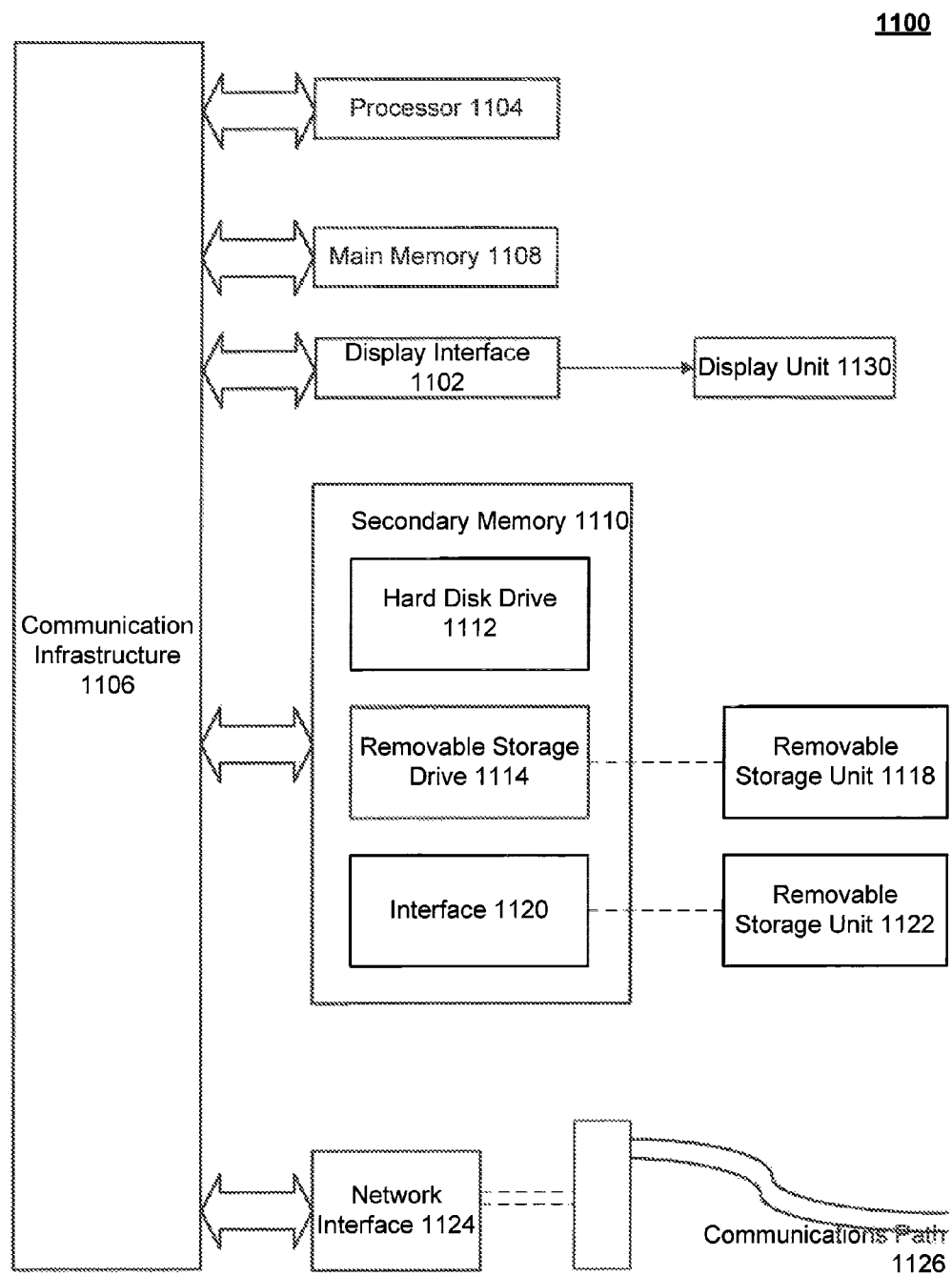

FIG. 11 is a diagram of an example computer system in which embodiments can be implemented.

The accompanying drawings, which are incorporated herein and form part of the specification, illustrate the embodiments of the present invention and, together with the description, further serve to explain the principles of embodiments and to enable a person skilled in the relevant art(s) to make and use such embodiments.

DETAILED DESCRIPTION

Embodiments relate to quantitatively identifying shifts in a mood of social media users and the trends between the shifts.

Unlike conventional systems based on the inputs of human subject matter experts, a quantitative mood shift identification. system using a qualitative approach, described in an embodiment herein, is capable of categorizing textual messages generated from the social media users over a selected period of time into a plurality of word categories, with each word category containing a set of words associated with the mood of social media users. The system calculates a score indicating an intensity of the mood of the social media users for each word category. The system further determines breakpoints in the mood of social media users that minimize a sum of square errors representing a measurement of a consistency of all data points over the selected period of time from inferred values of the scores of the data points derived using the breakpoints over the selected period of time. The system objectively searches space of all possible breakpoints for the word categories to identify a defined number and locations of the breakpoints. Accordingly, the breakpoints over the selected period of time are interpreted to identify the shifts in the mood of social media users.

As will be described in further detail below, embodiments can provide a quantitative approach to analyze social media data sets without the bias of human subject matter experts. Embodiments can further identify a set of breakpoints to detect significant changes in moods, as revealed by the emotional dynamics of users of the social media with scientific rigor and objectivity. Embodiments can also create a "social radar" to sense perceptions, attitudes, beliefs and behaviors of social media users about current. events and interpret their meaning politically and socially. Moreover, embodiments can forecast trends and future mood shifts of the social media users, and thus anticipate future events.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

System

Figure 1:
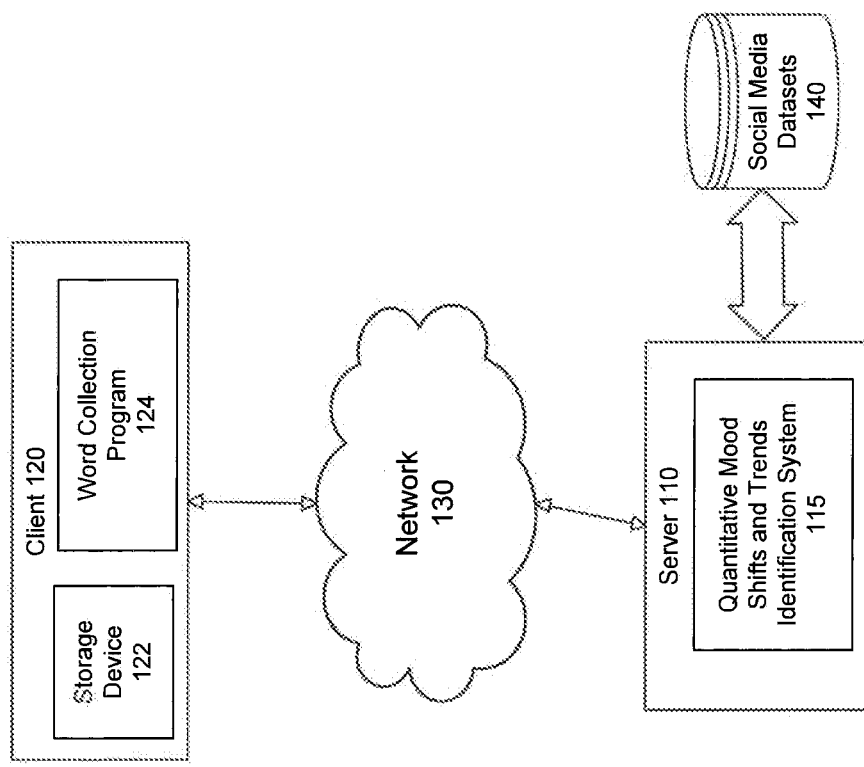
FIG. 1 illustrates a system for quantitatively identifying shifts in a mood and trends between shifts of social media users, according to an embodiment.

FIG. 1 illustrates a system 100 according to an embodiment. Referring to FIG. 1, system 100 includes a server 110, a quantitative mood shifts and trends identification system 115, a client 120, a network 130, and social media datasets 140.

Client 120 communicates with server 110 over the network 130. Although only one server 110 is shown, more servers may be used as necessary. Network 130 may be any network or combination of networks that carry data communication. Such network can include, but is not limited to, a local area network, medium area network, and/or wide area network such as the Internet.

Client 120 includes a storage device 122 and a word collection program 124. Word collection program 124 may be any application software or program designed to probe and analyze the content of texts. An example word collection program 124 can generate sizeable datasets from social media posts such as posts to Twitter called "tweets." The datasets can be stored in social media datasets 140. Although only one client 120 is shown, more clients may be used as necessary. Storage device 122, which will be described in detail with respect to FIG. 11, can be any device for recording and storing information, which includes but is not limited to, flash memory, magnetic tape and optical discs.

Server 110 can host quantitative mood shifts and trends identification system 115. As illustrated in FIG. 1, client 120 can send data requests to server 110, which can in turn invoke quantitative mood shift identification system 115 for further processing.

Quantitative mood shifts and trends identification system 115 can be software, firmware, or hardware or any combination thereof in a computing device. System 100 can be implemented on or implemented by one or more computing devices. As will be described with respect to FIG. 11, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Figure 2:
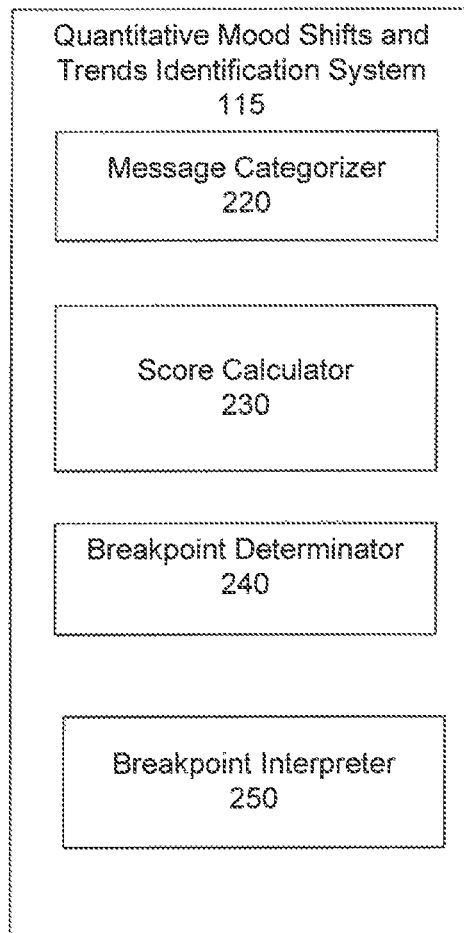
FIG. 2 illustrates elements of the quantitative mood shift identification system, according to an embodiment.

FIG. 2 illustrates elements of the quantitative mood shift and trend identification system, according to an embodiment. In the example shown in FIG. 2, quantitative mood shifts and trends identification system 115 includes message categorizer 220, score calculator 230, breakpoint determinator 240 and breakpoint interpreter 250.

Message categorizer 220 categorizes textual messages gathered from the word collection program 124 into a plurality of word categories. In one embodiment, the textual messages can be datasets drawn from any social media platforms such as Facebook, Twitter, blogs, or any combination thereof. In another embodiment, the textual messages can be originated from sources other than social media. For example, the textual messages may contain a variety of different text genres, including college writing samples, science articles, blogs, novels, poems, talking, and newspapers. In still another embodiment, the textual messages are short messages suitable to be analyzed by message categorizer 220. In still another embodiment, the textual messages are drawn from large datasets representative of an unbiased sample of the social media users' moods and emotions.

Each word category contains a set of words associated with the mood of social media users. For example, message categorizer 220 may categorize textual messages into various categories. The word categories may contain emotion categories such as "positive emotion," "negative emotion," "sadness," and "swear." For instance, people use positive emotion words (e.g., "love," "nice," or "sweet") when writing about a positive event and negative emotion words (e.g., "hurt," "ugly," or "nasty") when writing about a negative event. Alternatively, the word categories may contain social categories such as "family" and "friends." Alternatively, the word categories may contain other types of categories not listed above.

In one embodiment, the use of certain function words (such as "the," "with," or "they") may be linked with personality and social processes, psychological states including depression, biological activity, reactions to individual life stressors, reactions to socially-shared stressors, deception, status, gender, age, and culture. For example, people who are feeling physical or emotional pain tend to focus their attention on themselves and therefore use more first-person singular pronouns in their speech or writing while they are in that state. As a result, various word categories can be created for a set of function words.

The use of emotion words such as "happy," "terrified," or "jealous", how people express emotion, and the valence of that emotion can tell us how people are experiencing the world. People react in radically different ways to traumatic or salient events, and how they react may reveal much about how they cope with the event and the degree to which the event will play a role in the future. Word collection programs may identify emotion accurately in language use. In addition, ratings of positive and negative emotions words in written texts by word collection programs may correspond with human ratings of the emotional content of those same written texts. As a result, various word categories can be created for a set of emotion words. Therefore, the function and emotion words used by social media users may provide psychological markers of their thought processes, emotional states, moods, intentions, and motivations.

Score calculator 230 calculates a score for each word category to indicate an intensity of the mood of the social media users. According to an embodiment, based on the categorization implemented by message categorizer 220, word collection program 124 can count the total number of words contained in the textual messages to be processed and the number of words falling into each of word category and send the numbers to score calculator 230 for processing. Alternatively, score calculator 230 can count the total number and the numbers for each word category. Score calculator 230 can calculate a ratio of number of words in the textual messages falling into the word category to a total number of words in the textual messages. In another embodiment, score calculator 230 can calculate a score to indicate the intensity of the mood based on this ratio. In still another embodiment, score calculator 230 can calculate or assign a score to indicate the intensity of the mood based on other mechanisms.

Figure 4:
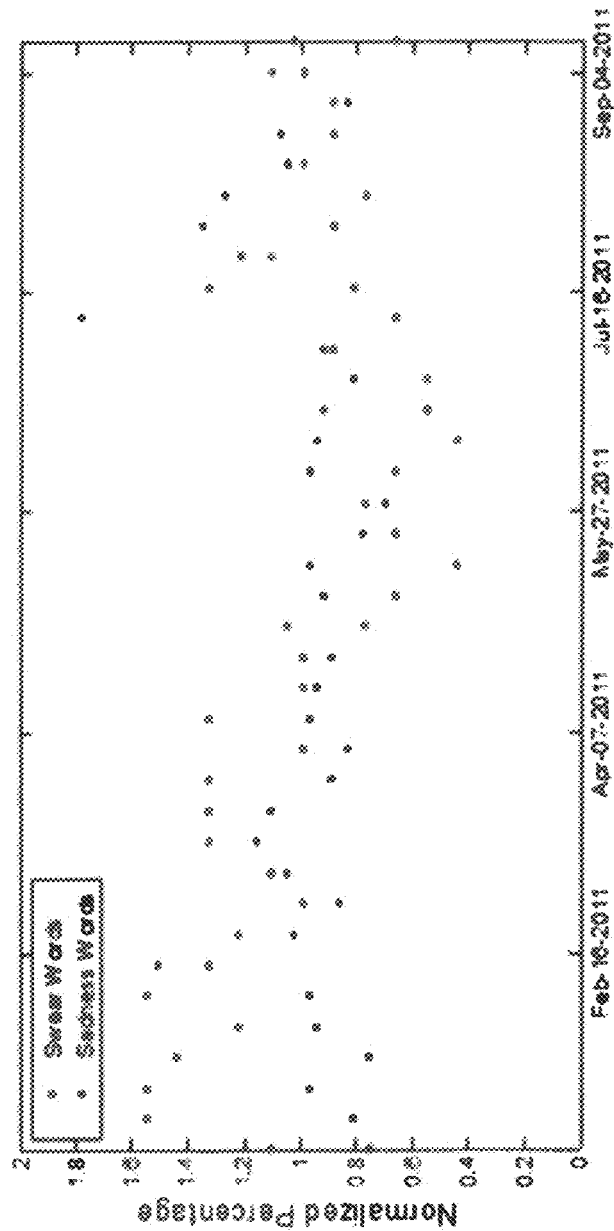
FIG. 4 depicts normalized ratios of swear and sadness words, according to an embodiment.

FIG. 4 depicts normalized ratios of swear and sadness words, according to an embodiment. In this embodiment, a word collection program is applied to raw tweet data aggregated over each week. Each dot signifies a ratio for the swear word category and the sadness word category respectively, computed as percentages of the swear words and sadness words over the total number of words in the aggregated tweets over the week. Rather than analyzing the data points by a human subject matter expert qualitatively, the data points are submitted to break determintor 240 to identify the mood shifts qualitatively.

Breakpoint determinator 240 determines breakpoints in the mood of social media users that minimize a sum of square errors representing a measurement of a consistency of all data point over the selected period of time from inferred values of the scores of the data points derived using the breakpointsover the selected period of time. Given that space of all possible breakpoints for the plurality of word categories are objectively searched, a defined number and locations of the breakpoints can be identified with scientific rigor and accuracy.

Figures 5A, 5B, 5C:
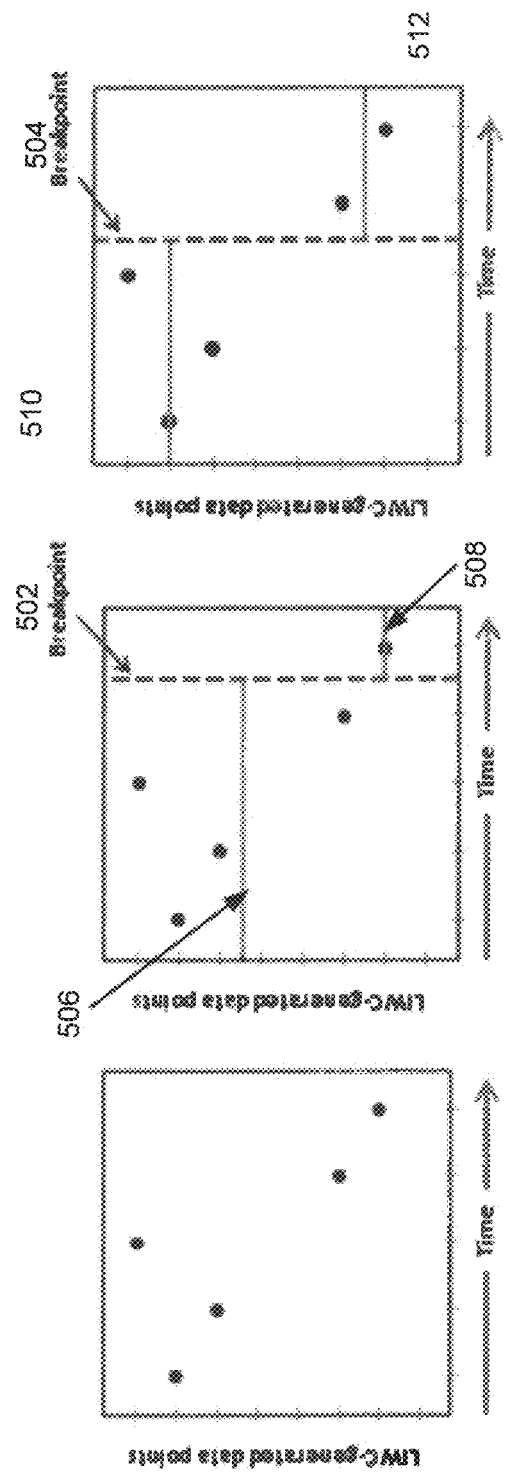
FIGS. 5A-5C illustrate the positions of breakpoints, according to an embodiment.

According to an embodiment, breakpoints represent data points in time that minimize a sum of square errors, where is a measurement of a consistency of all data points from inferred values of the scores of the data points derived using the breakpoints FIG. 5A-5C illustrate the positions of breakpoints, according to an embodiment. Referring in FIG. 5A, there are five raw data points in this hypothetical dataset, with each data point representing a score corresponding to the intensity of the mood for a word category. Over a selected period of time transitioning from data point 1 to 5, for example, a world event may cause discontinuously moves in the mood of the social media users from one state to another. For example, in FIG. 5B, breakpoint 502, as indicated by the vertical line, occurs between data points 4 and 5. Breakpoint 502 divides the five data points into two regions. Horizontal lines 506 and 508 represent an average of datapoint values in each region, respectively. In another example in FIG. 5C, breakpoint 504 occurs between data points 3 and 4.

Figures 6A, 6B:
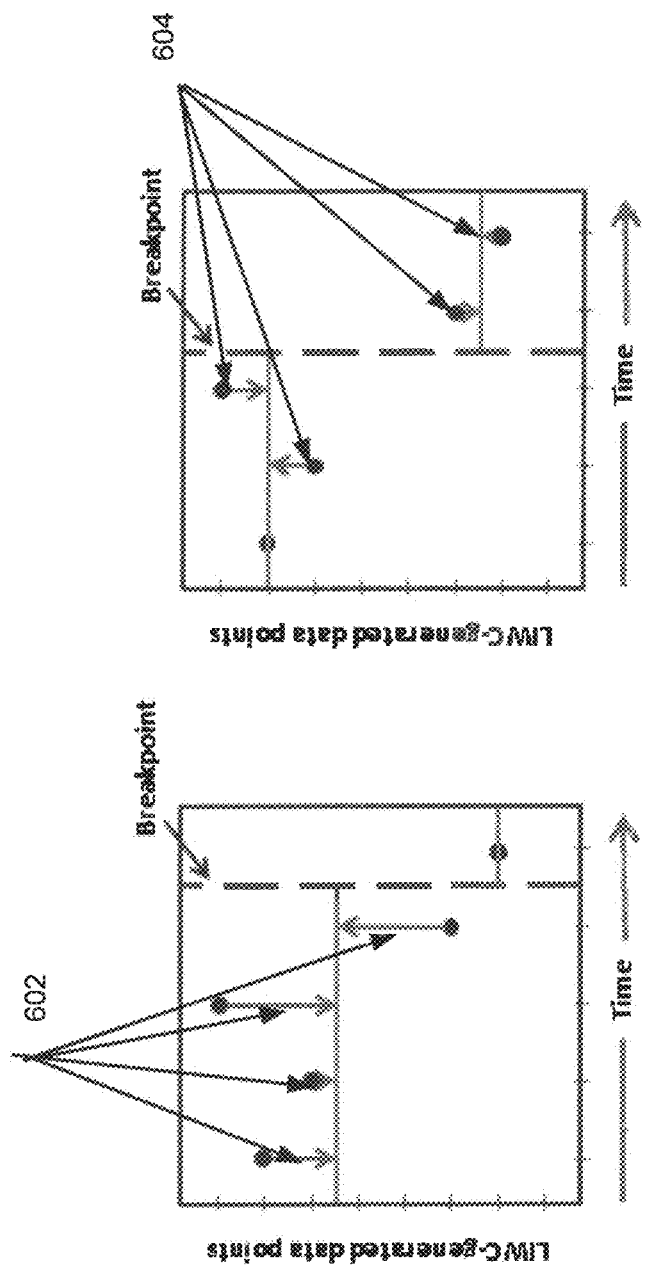
FIGS. 6A-6B illustrate a determination of the breakpoints, according to an embodiment.

Breakpoint determinator 240 is capable of quantitatively determining a best set of breakpoints. FIG. 6A-6B illustrate a determination of the breakpoints, according to an embodiment. According to the embodiment in FIG. 6A, the breakpoint 602 is selected to be located between data points 4 and 5, which divides the five data points into two regions. Breakpoint determinator 240 determines the distances of each data point to the average in the corresponding region, as represented by arrows 602 in FIG. 7A. In the embodiment described in FIG. 7A, arrows 602 correspond to square errors that represent a measurement of a consistency of all data point from inferred values of the scores of the data points derived using the breakpoints. in another embodiment in FIG. 7B, breakpoint 602 is selected to be located between data points 3 and 4. Likewise, Breakpoint determinator 240 determines the distances of each data point to the average in the corresponding region, as represented by arrows 604, Which correspond to the square errors representing a measurement of a consistency of all data point over the selected period of time from inferred values of the scores of the data. points derived using the breakpoints. Because the position of breakpoint 604 in FIG. 6B affords a smaller summation of distances of the arrows, thus a smaller square error, breakpoint determinator 240 arrives at the conclusion that the breakpoint 604 in FIG. 6A is the suboptimal alternative when compared with the alternative illustrated in FIG. 6B.

In the simple example with five data points illustrated above, a human subject matter expert may find the best breakpoint intuitively. However, for the raw Twitter data such as shown in FIG. 4, intuition may be a slow and biased approach to identify the shifts without scientific rigor and objectivity. In contrast, breakpoint determinator 240 is capable to conduct computational intensive tasks to search all space of possible positions to identify a best set of breakpoints.

According to an embodiment, rather than only examining two regions illustrated above, breakpoint determinator 240 may search more regions depending on the partitions and complexities of the data points. According to another embodiment, rather than consider a single mood indicator such as "swear" words, multiple mood indicators can be considered. According to still another embodiment, rather than assuming each data. point is constant in time and represented as dot in a graph, each data point can be constantly changing in time and thus can be represented by a straight line.

Figure 7:
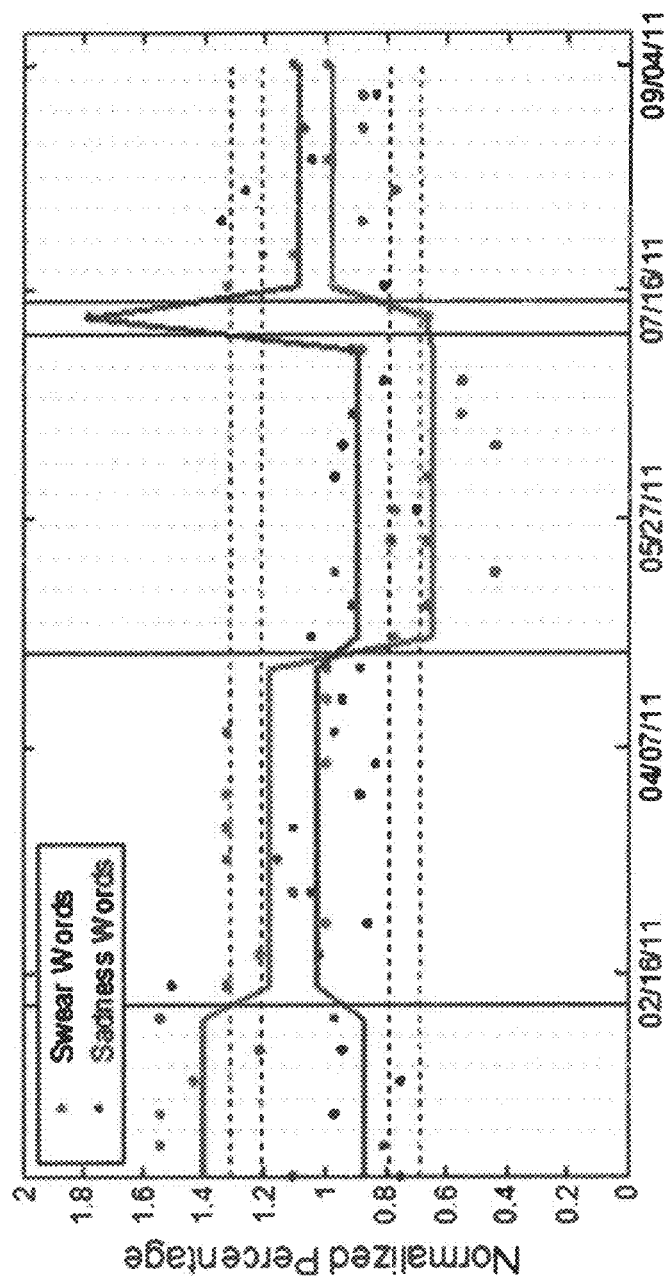
FIG. 7 illustrates breakpoint analysis of normalized ratios of swear and sadness words using a constant model, according to an embodiment.

FIG. 7 illustrates breakpoint analysis of normalized ratios of swear and sadness words using a constant model, according to an embodiment. In this embodiment, based on the score obtained from score calculator 230, breakpoint determinator 240 models the score for each word category as constant in time within a breakpoint region. As illustrated in FIG. 7, based on the weekly aggregated tweets, breakpoint determinator 240 identifies five breakpoint regions and the trends within each breakpoint region, with scores for swear words and sadness words remaining constant in time within each breakpoint region.

Figure 8:
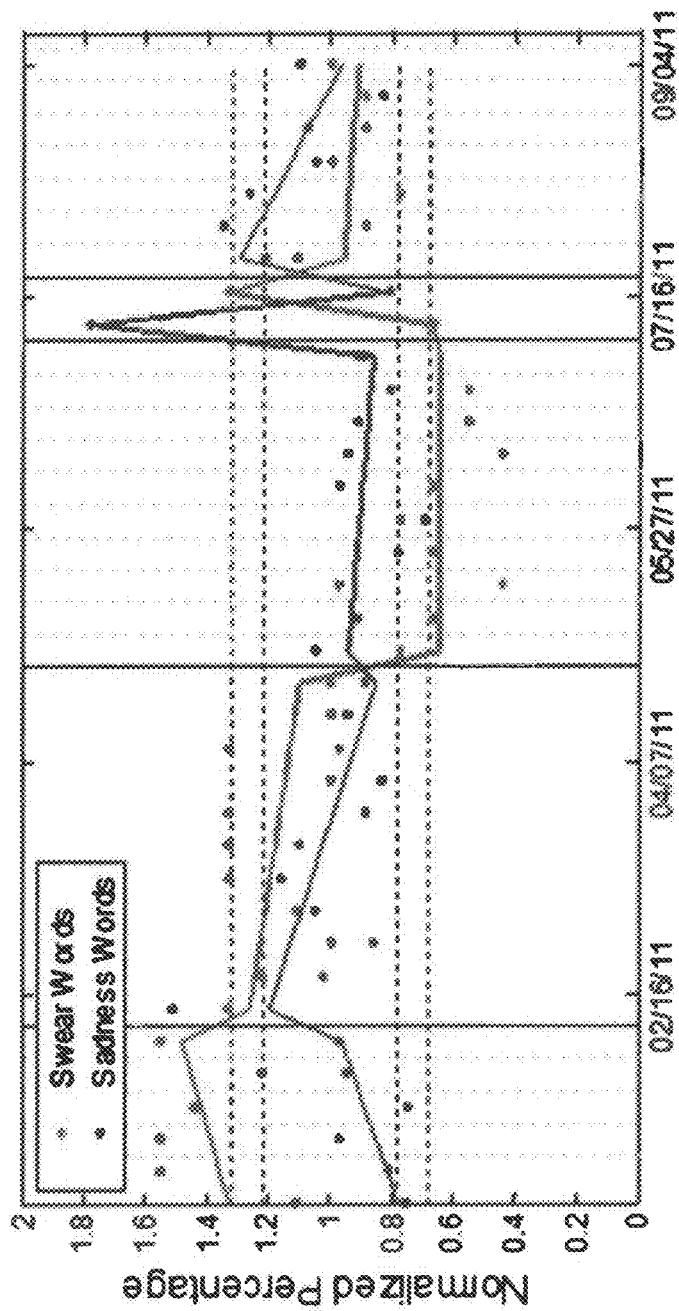
FIG. 8 illustrates breakpoint analysis of normalized ratios of swear and sadness words using a linear model, according to an embodiment.

FIG. 8 illustrates breakpoint analysis of normalized ratios of swear and sadness words using a linear model, according to an embodiment. In this embodiment, based on the score obtained from score calculator 230, breakpoint determinator 240 models the score for each word category as linear in time within a breakpoint region.

In the embodiments described above, each data point is modeled as having the same importance. However, in some other embodiments, breakpoint determinator 240 may determine that the importance of data point varies to reflect differing confidences in each data point. This differing confidence may reflect the number of tweets sampled to generate each data point.

In other embodiments, breakpoint determinator 240 may attach a different importance to each dataset corresponding to a mood indicator or word category. For example, breakpoint determinator 240 determines that the mood indicator sadness is more important than the mood indicator happiness. Thus, a heavier weight may be assigned to the sadness dataset than that of the happiness dataset. Alternatively, a different importance is assigned to the same data set reflecting different experiences with each dataset for different applications.

In still other embodiments, rather than processing the historic data after the fact, breakpoint determinator 240 may process the data in real time as they are being created and measured to enhance situational awareness.

Breakpoint interpreter 250 analyzes the breakpoints over the selected period of time to identify mood shifts and forecast future trends. For example, in an embodiment, breakpoint interpreter 250 analyzes how Twitter users' emotions change in the present and recent past as events unfolded, based on the quantitatively calculated breakpoints at which Twitter users' emotions shifted into a new phase.

Furthermore, breakpoint interpreter 250 may include a trend identifier to identify a trend in the mood of social media users. A trend identifier may include a mood forecaster to forecast future mood shifts of the social media users based on previous breakpoints determined from historic textual messages. According to one embodiment, the mood forecaster extends a derived trend line from a most recent breakpoint to determine a forecasted value. In another embodiment, the mood forecaster extends a derived trend line from a most recent breakpoint with a horizontal slope to determine a forecasted value.

Figure 9:
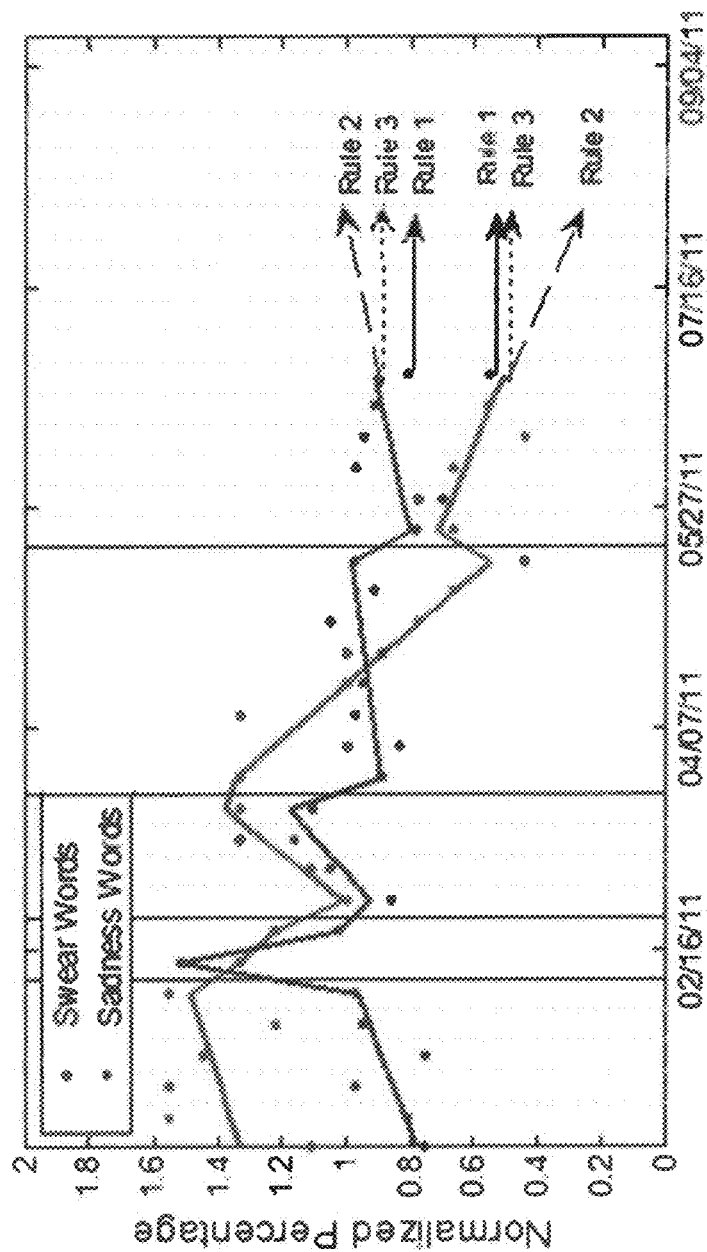
FIG. 9 illustrates three example approaches to calculate a forecasted value of a mood indicator based on previous values, according to an embodiment.

FIG. 9 illustrates three example approaches to calculate a forecasted value of a mood indicator based on the previous values, according to an embodiment. As indicated in FIG. 9, Rule 1 uses the last data point to forecast the value of a mood indicator such as swear or sadness words without using the breakpoint analysis, assuming that the last data point is the best estimate for the future. Rule 1 may be considered as the baseline forecast rule for comparison purpose.

Rule 2, corresponding to an embodiment implemented by the mood forecaster, may perform a breakpoint analysis with the linear model to forecast future trends by projecting ahead in time, starting from the most recent breakpoint. In this embodiment, mood forecaster extends the most recently derived trend line out longer by continuing along its current slope to determine the forecasted value. This natural approach may demonstrate a comparative advantage if there is an extensive amount of data in each individual breakpoint region and the trend lines have large slopes.

Rule 3, corresponding to another embodiment of mood forecaster, performs a breakpoint analysis with the linear model to forecast that future values will be the same as the last estimated data point. In this embodiment, the mood forecaster extends the most recently derived trend line out from its end with a horizontal slope, rather than continuing along the current slope of the line as in Rule 2. This approach may be considered as a conservative and robust rule which performs well in the event that the data points have a broader range and slopes of the trend lines have greater variations.

FIGS. 10A-B illustrate forecast errors in predicting sadness and swear daily data, according to an embodiment. As illustrated in FIGS. 10A-B, the accuracy of the three rules discussed in FIG. 9 are examined using two mood indicators (swear and sadness). The forecasted values are generated at first, 8th, and 15th days into the future. The forecast errors, as an indicator of accuracy of prediction for each rule, are calculated and compared. According to FIG. 10A, Rule 3 consistently outperforms the baseline Rule 1 as well as Rule 2 using swear as an indicator. In addition, Rule 2 outperforms the baseline Rule 1 when applied against the normalized swear data but falls short when applied against the normalized sadness data, suggesting the performance of rule 2 is specific to the type of the word category being investigated. Likewise, FIG. 10B demonstrates the rule 3 outperforms rule 1 and 2 respective, using sadness as the mood indicator. Accordingly, rule 3 may emerge as a better rule to predict future trends in this quantitative methodology. Embodiments of the elements of quantitative mood shifts and trends identification system 115 in FIG. 2, as described herein, may be further configured to run in parallel. Such parallel execution of these elements would increase the efficiency and speed of quantitative mood shifts and trends identification system 115.

Method

Figure 3:
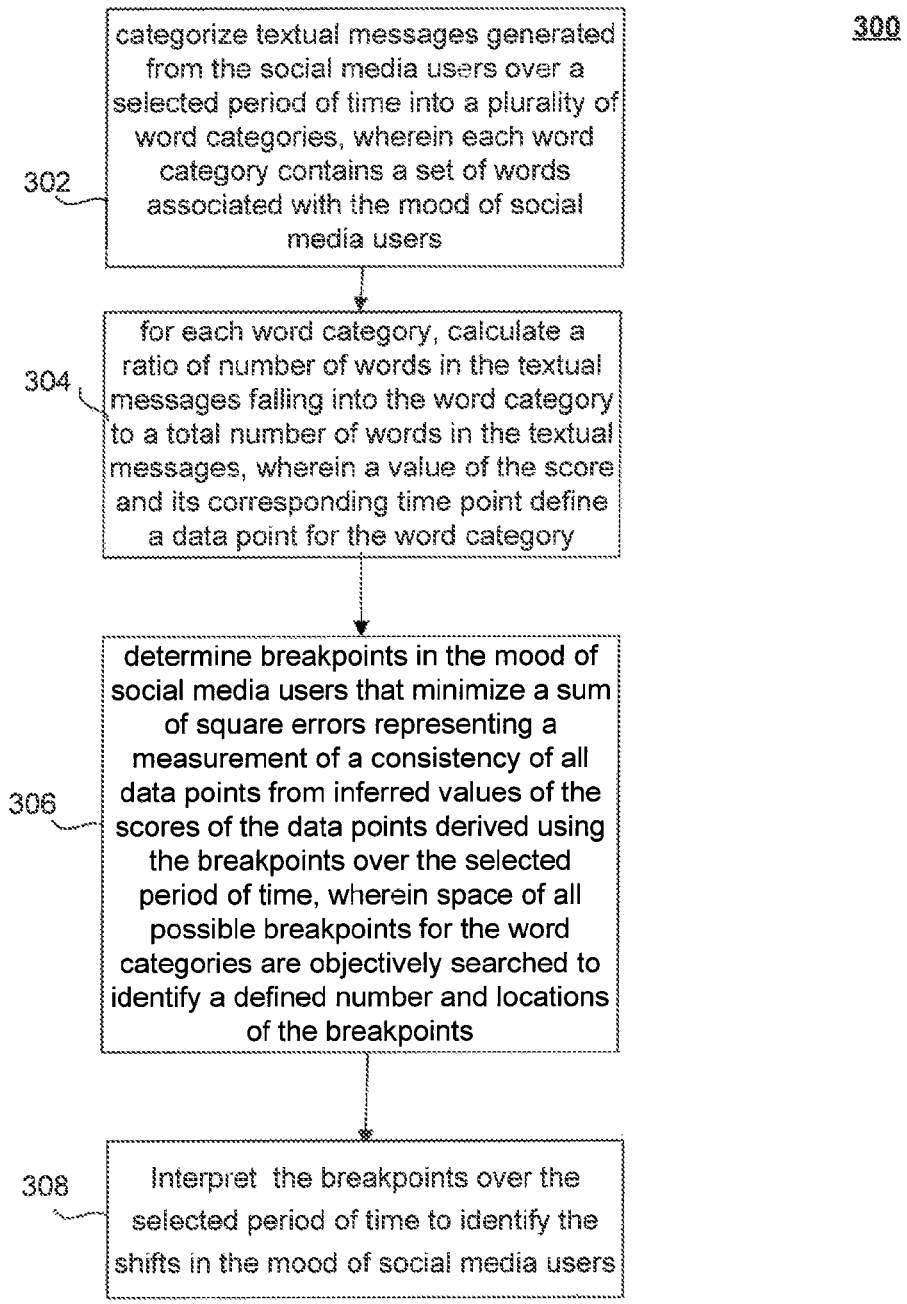
FIG. 3 is a flowchart of a method for quantitatively identifying shifts in a mood of social media users, according to an embodiment.

FIG. 3 is a flowchart of a method for quantitatively identifying shifts in a mood of social media users, according to an embodiment. For ease of explanation, method 300 will be described with respect to system 115 of FIG. 2, as described above. However, method 300 is not intended to be limited thereto.

At stage 302, textual messages generated from the social media users over a selected period of time are categorized into a plurality of word categories, with each word category containing a set of words associated with the mood of social media users. Message categorizer 220 may categorize the textual messages into a plurality of word categories.

At stage 304, a score indicating an intensity of the mood of social media users is calculated for each word category. Based on the categorization of message categorizer 220, score calculator 230 may calculate the score indicating the intensity of mood and emotion. In an embodiment, a ratio of number of words in the textual messages falling into the word category to a total number of words in the textual messages may be calculated. Subsequently, a series of ratios across time, one for each day or week, may be generated for each word category. As a result, these ratios may be submitted as the raw material to be processed by the quantitative mood shifts and trends identification system 115 at stage 306.

At stage 306, breakpoints in the mood of social media users that minimize a sum of square errors are determined. The square errors represent a measurement of consistency of all data points from inferred values of the scores of the data points derived using the breakpoints over the selected period of time. Space of all possible breakpoints for the word categories is objectively searched to identify a defined number and locations of the breakpoints. Breakpoint determinator 240 may determine the breakpoints quantitatively with scientific vigor and accuracy. In one embodiment, the mechanism applied by the breakpoint determinator 240 to find the best set of breakpoints can be implemented according to various equations shown below.

For example, suppose we have a set of K time series $x_n^k$ for $n=1, \ldots, N$ and $k=1, \ldots, K$ with time, n, separated into M partitions with breakpoints at $m_o(=0)\ m_1, \ldots, m_{M-1}, m_M=N$. Suppose, within a breakpoint region, it is reasonable to assume the data arises either from a collection of piecewise constants, i.e., $x_n^k \approx y_j^k$, for $n=m_{j-1}+1, \ldots, m_j$, a collection of piecewise linear functions, i.e., $x_n^k \approx y_j^k(1)+n y_j^k(2)$, for $n=m_{j-1}+1, \ldots, m_j$ or more generally $$\vec{x}_j^k(\vec{m}) \approx A_j(\vec{m}) \vec{y}_j^k \text{ for } j = 1, \ldots, M \tag{1}$$

where $$\vec{x}_j^k(\vec{m}) = \left( x_{m_{j-1}+1}^k, x_{m_{j}+2,\ldots}^k, x_{m_j}^k \right)^T \tag{2}$$

$$A_j(m) = \begin{pmatrix} 1 & m_j+1 & (m_j+1)^2 & \ldots & (m_j+1)^{D-1} \\ \ldots & \ldots & \ldots & \ldots & \ldots \\ 1 & m_{j+1} & (m_{j+1})^2 & \ldots & (m_{j+1})^{D-1} \end{pmatrix} \tag{3}$$

where $\vec{y}_j^k = y_j^k(1), y_j^k(2), \ldots, y_j^k(D-1))^T$ is an unknown vector to be determined For the case of D=1, this is a matrix with just one column and each entry is a 1. This matrix may correspond to the constant model discussed above, where the data points are modeled as constant within a single breakpoint region. For the case of D=2, this is a matrix with two columns. This matrix may correspond to the linear model discussed above, where the data points are modeled as linear and represented as a straight line within a single breakpoint region. For other values of D, other models may be applied to analyze and determine the dynamics of emotions, such as a quadratic model, a third order polynomial, etc.

The best breakpoints can be found from solving $$\vec{m}^* = \operatorname*{argmin}_{\vec{m}} \left[ \sum_{j=1}^{M} \sum_{k} w_k \min_{\vec{y}_j^k} \left\| \vec{x}_j^k(\vec{m}) - A_j(\vec{m}) \vec{y}_j^k \right\|_P^2 \right] \tag{4}$$

Equation (4) can be interpreted as searching the space of all possible breakpoints, $\vec{m}$, for the one which minimizes the distance between each data point of each data set and the fitted estimate from equation (1) (which may be a constant, straightline, or another function) while the distances are weighted by the importance of the data point, (indicated by P), as well as the importance of the data set (indicated by $\vec{w}$). P may be set, for example, based on the number of tweets which generate the data points, or may be set as being diminished as one looks back in time. $\vec{w}$ may be set based on the seeming relevance of each data set on the issues of most interest. The minimization in equation (4) corresponds to finding the best constant or the best straight line or the best quadratic, depending on the value of D.

The inner minimization may be a simple linear regression, and the best $\vec{y}_j^k$ in equation (4) may be $$\vec{y}_j^{k*} = (A_j^T(\vec{m}) P A_j(\vec{m}))^{-1} A_j^T(\vec{m}) P \vec{x}_j^k \tag{5}$$

Equation (5) may illustrate an alternative approach to calculate best $\vec{y}_j^k$ which denotes the parameters of the best constant, best straight line or best quadratic, depending on the value of D. In one embodiment, the best checkpoints can be determined based on a Dth degree polynominal model, where the score for each word category is modeled as a Dth degree polynominal within a breakpoint region. In another embodiment, the best checkpoints can be determined based on a finite parameter model, where the score for each word category is modeled as a finite parameter within a breakpoint region.

According to an embodiment, the breakpoints can be found using the faster recursive algorithm discussed below. The best measure of i partitions of $\{x_t: t=1, \ldots, T\}$ can be defined as $$C_{iT} = \min_{\{\vec{m}:\ 0 \le m_1 \le \ldots \le m_{i-1} \le T\}} S_i(\vec{m}) \tag{6.1}$$

$$= \min_{\{\vec{m}:\ 0 \le m_1 \le \ldots \le m_{i-1} \le T\}} \{S_{i-1}(\vec{m}) + d(m_{i-1}, T)\}$$

so $$C_{iT} = \begin{cases} d(0, T) & i = 1, \\ \min_{\{m_{i-1}: m_{i-1} \le T\}} \left\{ \begin{array}{c} C_{i-1, m_{i-1}} + \\ d(m_{i-1}, T) \end{array} \right\} & i = 2, \ldots, M. \end{cases}$$

Equation (6.1) can be interpreted as follows: the measure of the best i partition of $\{1, \ldots, T\}$ is the minimum with respect to $m_{i-1}$ of the best i−1 partition of $\{1, \ldots, m_{i-1}\}$ and the partition $\{m_{i-1}+1, \ldots, T\}$. If the last breakpoint is at $m_M=t$, then the best $i^{th}$ breakpoint can be:

$$m_{it}^* = \arg \min_{\{m_i:\ m_i \le m_{i+1,t}^*\}} \{S_M(m_{1,t}^*, \tag{6.2}$$

$$\ldots, m_{i-1,t}^*, m_i, m_{i+1,t}^*, \ldots, m_{M-1,t}^*, t)\} =$$

$$\arg \min_{\{m_i:\ m_i \le m_{i+1,t}^*\}} \left\{ C_{i,m_i} + d(m_i, m_{i+1,t}^*) + \sum_{j=i+2}^{M} d(m_{j-1,t}^*, m_{j,t}^*) \right\}$$

for all i(where $m_{M,t}^* = t$), and $m_{j,t}^*$ is the best $j^{th}$ breakpoint for $$j = 1, 2, \ldots, i - 1, i + 1, \ldots, M.$$

$$m_{it}^* = $$

$$\begin{cases} \operatorname{argmin}_{\{m_i:\ m_i \le m_{i+1,t}^*\}} \{C_{i,m_i} + d(m_i, m_{i+1,t}^*)\} & i = 1, \ldots, M - 1 \\ t & i = M \end{cases}$$

It follows from (6.2) that if $m^*_{i+1,t+1} = m^*_{i+1,t}$, then $m^*_{i+1} = m^*_{i,t}$, i.e., if the $(i+1)^{th}$ breakpoint is unchanged by adding the $(t+1)^{th}$ data point, then the $i^{th}$ breakpoint (and in fact all previous breakpoints) are unchanged. Hence, (2.2) can replaced with $$m_{i,t+1}^* = \qquad (6.3)$$

$$\begin{cases} \text{argmin}_{\{m_i: m_i \le m_{i+1,t+1}^*\}} \begin{Bmatrix} C_{i,m_i} + \\ d(m_i, m_{i+1,t+1}^*) \end{Bmatrix} & i = 1, \ldots, M-1 \\ & \text{and } m_{i+1,t+1}^* \ne m_{i+1,t}^*, \\ m_{it}^* & i = 1, \ldots, M-1 \\ & \text{and } m_{i+1,t+1}^* = m_{i+1,t}^*, \\ t+1 & i = M. \end{cases}$$

Thus, using (6.3) instead of (6.2), while analytically equivalent, can typically reduce the amount of required computation. The following dynamical program algorithm can be suggested:

---
1. For $i = 1$ to M: for $t = 1, \ldots, T$: find $C_{it}$ using (6.1).
2. For $i = M - 1$ to 1: find $m_{iT}^*$ using (6.3).
---

Assuming all the $C_{it}$ are saved after being computed (using TM amount of memory), the limiting step of the algorithm is step 1 which requires $O(T^2 M)$ evaluations of d. From (6.2), (6.3) and (6.4), assuming D<M, evaluation of d requires $O(TLD^2)$ multiplications. So step 1 and hence the algorithm above can require $O(T^{3MLD^2})$ which can typically be dominated by the $T^3$ term.

Notably, in some embodiments, as new data emerge over time, breakpoint determinator 240 may re-calculate the breakpoints to determine whether they still provide the best set of phases to the ever-changing data. With the passage of time, breakpoints can appear, disappear, and re-appear if the picture of trends changes with newly-acquired data. Thus, the breakpoints may not be considered as permanent markers of where a phase-shift occurred in emotions.

For example, the dynamic program algorithm can be transformed into one which can process data in real time. This algorithm can be transformed into one which can process data in real time. Suppose the algorithm has been run for $t=1, \ldots, T$, so $m_{i,T}$ and $C_{i,T}$ are known for all i and then $\vec{x}_{T+1}$ is measured. The update can entail: STEP 1, for $i=1$ to M, find $C_{i,T+1}$ using (6.1). STEP 2, for $i=M$ to 1: find $m_{i,T+1}$ using (6.3). This can entail $O(TLD^2)$ multiplications. Note that $C_{M,T+1} - C_{M-1,T}$ can be an indicator of the impact of putting $x_{t+1}$ in its own (singleton) partition. According to one embodiment, the number of breakpoint can be computed automatically. Suppose the first equation in (6.3) is modified for the case of $i \ne M$ and $m_{i+1,t+1}^* \ne m_{i+1,t}^*$ to $$m_{i,t+1}^* = \arg\min_{\{m: 0 \le m \le m_{i+1,t+1}\}} \{C_{im} + d(m, m_{i+1,t+1}) - \lambda_\chi(m, 0)\}. \qquad (6.4)$$

For example, the lower limit of the min function can be listed as 0<m. This can be implicitly the lower limit in (6.3) but not listed for presentation simplicity. The reward λ in (6.4) can effectively assign a linear incentive to reduce the number of breakpoints. Hence, if the desired number of breakpoints is a priori unknown, (6.4) can provide a rationale for finding this number, i.e., $$M^* = \text{argmin}_M \left[ M\lambda + \min_{\vec{m}} S_M(\vec{m}) \right]$$

$$= \text{argmin}_M [M\lambda + C_{MT}].$$

According to another embodiment, inertia can be incorporated into the location of the breakpoints. If the dynamical program algorithm discussed above is run in real time, for instance, it is rerun after each additional data point is available, some inertia can be introduced in the location of the breakpoints. This can be accomplished by further modifying (6.4) to $$m_{i,t+1}^* = \arg\min_{\{m: 0 \le m \le m_{i+1,t+1}\}} \{C_{im} + d(m, m_{i+1,t+1}) - \varepsilon_\chi(m, m_{i,t}) - \lambda_\chi(m, 0)\}$$

In this embodiment, the positive reward c can reward the breakpoint by not moving when a new data point is added.

According to another embodiment, the relative importance of the weights of the different time series can be computed. For example, in absence of training data, the weights can be used to normalize the data so each stream has the same expected mean. However, in the event that there is training data through external means, such as due to an expert or external data, the weights of the data points can be calculated. Thus, rather than assuming the weights, $\vec{w}$, if we know the best breakpoints $\vec{m}_D^+ = (m_1^+, \ldots, m_{M+1}^+)$ for a training dataset, then assuming the weights $\vec{w}$ are those which are most consistent with the training data, i.e., we can derive $$\vec{w}^* = \arg\min_{\{\vec{w}: \vec{1}^T \vec{w} = 1\}} \|\vec{m}^+ - \vec{m}^*(\vec{w})\|.$$

Alternatively, if there is training data of external data hypothesized to equal (an unknown) weighted average of the data, $\vec{z}$, then one lets $[X]_{(l,t)} = x_t^l$ and then computes $$\vec{w} = \text{argmin}_{\vec{w}} \|X\vec{w} - \vec{z}\| P$$

$$= (XPX^T)^{-1} XP\vec{z}.$$

Note that $\vec{w}$ need not contain exclusively non-negative values nor sum to 1.

According to still another embodiment, the future trend can be forecasted. After the analysis is performed for $t=1, \ldots, T$, from (1), the estimated value of $x_t^l$ is $$\tilde{\chi}_T^l = (1 \, TT^2 \ldots T^D) \vec{\theta}_M^l.$$

To predict subsequent values of $x_t^l$, discussed above, three different rules can be considered $\hat{x}_{T+\Delta}^l = x_T^l$, $\hat{x}_{T+\Delta}^l = \tilde{x}_T^l$, and $\hat{x}_{T+\Delta}^l = \tilde{x}_{T+\Delta}^l$. Rule 1 can be viewed as the naive approach, which assumes the future values of $x_t^l$ are the same as the last known value. Rule 2 projects forward with the estimated value. Rule 3 can be a compromise between Rule 1 and Rule 2, which uses the last estimate. These rules could be validated by computing:

$$J_1^l(\Delta) = \Sigma_{t=t_\alpha}^{T-\Delta}(x_{T+\Delta}^l - x_\tau^l)^2, J_2^l(\Delta) = \Sigma_{t=t_0}^{T-\Delta}(x_{T+\Delta}^l - \hat{x}_{T+\Delta}^l)^2.$$

and $$J_3^l(\Delta) = \Sigma_{t=t_\alpha}^{T-\Delta}(x_{T+\Delta}^l - \hat{x}_\tau^l)^2.$$

The forecasting method based on the title 2 above, although an unbiased approach, may be inferior to the rule 3 which is more robust for the case of limited amounts of data when large errors are induced into $\vec{\theta}^{\,l}$.

Equipped with the breakpoints determined, at stage 308, the breakpoints are interpreted. For example, breakpoint interpreter 250 may interpret the breakpoints. Consequently, breakpoint interpreter 250 may identify mood shifts and forecast future trends.

Example Computer System Implementation

Embodiments shown in FIGS. 1-10, or any part(s) or function(s) thereof, may be implemented using hardware, software modules, firmware, tangible computer readable media having instructions stored thereon, or a combination thereof and may be implemented in one or more computer systems or other processing systems.

FIG. 11 illustrates an example computer system 1100 in which embodiments, or portions thereof, may be implemented as computer-readable code. For example, quantitative mood shifts and trends identification system 115, including its components, as shown in FIG. 2 can be implemented in computer system 1100 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-10.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 1100. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1104 may be a special purpose or a general purpose processor device. As will be appreciated by persons skilled in the relevant art, processor device 1104 may also be a single processor in a multi-core/multiprocessor system, such system operating alone, or in a cluster of computing devices operating in a cluster or server farm. Processor device 1104 is connected to a communication infrastructure 1106, for example, a bus, message queue, network, or multi-core message-passing scheme.

Computer system 1100 also includes a main memory 1108, for example, random access memory (RAM), and may also include a secondary memory 1110. Secondary memory 1110 may include, for example, a hard disk drive 1112, removable storage drive 1114. Removable storage drive 1114 may comprise a floppy disk drive, a magnetic tape drive, an optical disk drive, a flash memory, or the like. The removable storage drive 1114 reads from and/or writes to a removable storage unit 1118 in a well-known manner. Removable storage unit 1118 may comprise a floppy disk, magnetic tape, optical disk, etc. which is read by and written to by removable storage drive 1114. As will be appreciated by persons skilled in the relevant art, removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software and data to be transferred from the removable storage unit 1122 to computer system 1100.

Computer system 1100 may also include a network interface 1124. Network interface 1124 allows software and data to be transferred between computer system 1100 and external devices. Network interface 1124 may include a modem, a network interface (such as an Ethernet card), a communications port, a PCMCIA slot and card, or the like. Software and data transferred via network interface 1124 may be in the form of signals, which may be electronic, electromagnetic, optical, or other signals capable of being received by network interface 1124. These signals may be provided to network interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Computer program medium and computer usable medium may also refer to memories, such as main memory 1108 and secondary memory 1110, which may be memory semiconductors (e.g. DRAMs, etc.).

Computer programs (also called computer control logic) are stored in main memory 1108 and/or secondary memory 1110. Computer programs may also be received via network interface 1124. Such computer programs, when executed, enable computer system 1100 to implement embodiments as discussed herein. In particular, the computer programs, when executed, enable processor device 1104 to implement the processes of embodiments of the present invention, such as the stages in the methods illustrated by flowchart 600 of FIGS. 6, discussed above. Accordingly, such computer programs represent controllers of the computer system 1100. Where embodiments are implemented using software, the software may be stored in a computer program product and loaded into computer system 1100 using removable storage drive 1114, interface 1120, and hard disk drive 1112, or network interface 1124.

Embodiments of the invention also may be directed to computer program products comprising software stored on any computer useable medium. Such software, when executed in one or more data processing device(s), causes a data processing device(s) to operate as described herein.

Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

Variations

As would be understood by a person skilled in the art based on the teachings herein, several variations of the above described features of quantitative mood shift system. These variations are within the scope of embodiments of the present invention. For the purpose of illustration only and not limitation, a few variations are provided herein.

In an example, one skilled in the art can envision several variations to the score calculation mechanism, as described above. In an embodiment, a different score calculation and assignment mechanism may be used in place of the calculation of the ratio for each word category described above.

In another example of a variation, embodiments of the elements of quantitative mood shift identification system in FIG. 2, as described herein may be further configured to run in parallel. Such parallel execution of these elements would greatly increase the efficiency and speed of quantitative mood shift identification system.

Conclusion

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. it is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but Should be defined only in accordance with the following claims and their equivalents.

What is claimed is:

1. A quantitative method for identifying shifts in a mood of social media users, comprising:

categorizing textual messages generated from the social media users over a selected period of time into a plurality of word categories, wherein each word category contains a set of words associated with the mood of social media users;

for each word category, calculating a score representing an intensity of the mood of the social media users, wherein a value of the score and its corresponding time point define a data point for the word category;

determining breakpoints in the mood of social media users that minimize a sum of square errors representing a measurement of a consistency of all data points from inferred values of the scores of the data points derived using the breakpoints over the selected period of time, wherein space of all possible breakpoints for the word categories are objectively searched to identify a defined number and locations of the breakpoints; and interpreting the breakpoints over the selected period of time to identify the shifts in the mood of social media users.

2. The method of claim 1, further comprising:

generating dictionaries that define the set of words contained in each word category.

3. The method of claim 1, identify a trend in the mood of social media users between two consecutive breakpoints.

4. The method of claim 1, wherein the determining is based on a constant model, wherein the score for each word category is modeled as constant in time within a breakpoint region.

5. The method of claim 1, wherein the determining is based on a linear model, wherein the score for each word category is modeled as linear within a breakpoint region.

6. The method of claim 1, wherein the determining is based on:

$$\vec{m}^* = \underset{\vec{m}}{\operatorname{argmin}} \left[ \sum_{j=1}^{M} \sum_{k} w_k \min_{\vec{y}_j^k} \left\| \vec{x}_j^k(\vec{m}) - A_j(\vec{m})\vec{y}_j^k \right\|_P^2 \right]$$

where $\vec{m}^*$ denotes a best choice of breakpoints that minimize the sum of square errors; $x_n^k$ denotes a set of K time series $x_n^k$ for n=1, ..., N and k=1, ..., K with time, n, separated into M partitions with breakpoints at $m_0(=0)$, $m_1$, ..., $m_{M-1}$, $m_M$=N; $\vec{m}$ denotes all possible breakpoints; $\vec{y}_j^k$ denotes an unknown vector to be determined defining trends between any two consecutive breakpoints; P denotes importance of a data point and w denotes inportance of a dataset.

7. The method of claim 6, wherein the determining is based on:

$$\vec{y}_j^{k*} = (A_j^T(\vec{m})PA_j(\vec{m}))^{-1} A_j^T(\vec{m})P\vec{x}_j^k$$

wherein $\vec{y}_j^{k*}$ denotes a best choice of $\vec{y}_j^k$ defined in claim 6.

8. The method of claim 6, wherein the determining is based on a fast, recursive algorithm defined as:

$$m_{i,t+1}^* = \begin{cases} \operatorname{argmin}_{\{m_i: \, m_i \leq m_{i+1,t+1}^*\}} \begin{Bmatrix} C_{i,m_i} + \\ d(m_i, m_{i+1,t+1}^*) \end{Bmatrix} & \begin{array}{l} i = 1, \ldots, M-1 \\ \text{and } m_{i+1,t+1}^* \neq m_{i+1,t}^*, \end{array} \\ m_{it}^* & \begin{array}{l} i = 1, \ldots, M-1 \\ \text{and } m_{i+1,t+1}^* = m_{i+1,t}^*, \end{array} \\ t+1 & i = M. \end{cases}$$

wherein i=1 to M-1 and i is evaluated in an order of i=M-1, i=M-2, ..., i=1; $C_{i,m_i}$ denotes a measure of a best i partition of $\{1, \ldots, m_i\}$; and $m^*_{it}$ denotes a best choice for the ith breakpoint assuming that the last breakpoint is $m_M = t$.

9. The method of claim 8, wherein the determining is based on:

$$C_{iT} = \begin{cases} d(0, T) & i = 1, \\ \min_{\{m_{i-1}: m_{i-1} \leq T\}} \begin{Bmatrix} C_{i-1, m_{i-1}} + \\ d(m_{i-1}, T) \end{Bmatrix} & i = 2, \ldots, M. \end{cases}$$

wherein i=1 to M; t=1 to T; $C_{iT}$ denotes a measure of a best i partition of $\{1, \ldots, T\}$, which is a minimum with respect to $m_{i-1}$ of a best i−1 partition of $\{1, \ldots, m_{i-1}\}$ and partition $\{m_{i-1}+1, \ldots, T\}$; $d(t_1, t_2)$ denotes a measure between two consecutive breakpoints at $t_1$ and $t_2$, respectively.

10. The method of claim 6, wherein determining is based on a real time algorithm defined as:

$$m_{i,t+1}^* = \arg\min_{\{m: \, 0 \leq m \leq m_{i+1,t+1}\}} \{C_{im} + d(m, m_{i+1,t+1}) - \lambda \chi(m, 0)\}.$$

wherein $\chi(m, 0)$ equals 1 if m=0 and otherwise equals 0; and λ denotes a reward to assign a linear incentive to reduce the number of breakpoints.

11. The method of claim 3, wherein identifying the trend further comprising:
identifying the trend to forecast future mood shifts of the social media users based on previous breakpoints determined from historic textual messages.

12. The method of claim 11, wherein the identifying the trend further comprises extending a derived trend line from a most recent breakpoint to determine a forecasted value.

13. The method of claim 11, wherein the identifying the trend further comprises extending a derived trend line from a most recent breakpoint with a horizontal slope to determine a forecasted value.

14. The method of claim 1, wherein the determining is based on a Dth degree polynominal model, wherein the score for each word category is modeled as a Dth degree polynominal within a breakpoint region.

15. The method of claim 1, wherein the determining is based on a finite parameter model, wherein the score for each word category is modeled as a finite parameter within a breakpoint region.

16. The method of claim 1, where in the calculating further comprises calculating a ratio of number of words in the textual messages falling into the word category to a total number of words in the textual messages.

17. The method of claim 1, wherein the textual messages are short messages generated from tweet and other social media.

18. The method of claim 1, wherein the textual messages are generated from sources other than social media.

19. A system for quantitatively identifying shifts in a mood of social media users, comprising:
a message categorizer, configured to categorize textual messages generated from the social media users over a selected period of time into a plurality of word categories, wherein each word category contains a set of words associated with the mood of social media users;
a score calculator, configured to, for each word category, calculate a score representing an intensity of the mood of the social media users, wherein a value of the score and its corresponding time point define a data point for the word category;
a breakpoint determinator, configured to determine breakpoints in the mood of social media users that minimize a sum of square errors representing a measurement of a consistency of all data points from inferred values of the scores of the data points derived using the breakpoints over the selected period of time, wherein space of all possible breakpoints for the plurality of word categories are objectively searched to identify a defined number and locations of the breakpoints; and
a breakpoint interpreter, configured to interpret the breakpoints over the selected period of time to identify the shifts in the mood of social media users.

20. The system of claim 19, further comprising:
a dictionary generator, configured to generate dictionaries that define the set of words contained in each word category.

21. The system of claim 19, further comprising:
a trend identifier, configured to identify a trend in the mood of social media users between two consecutive breakpoints.

22. The system of claim 19, wherein the breakpoint determinator is further configured to determine the breakpoints based on a constant model, wherein the score for each word category is modeled as constant in time within a breakpoint region.

23. The system of claim 19, wherein the breakpoint determinator is further configured to determine the breakpoints based on a linear model, wherein the score for each word category is modeled as linear within a breakpoint region.

24. The system of claim 19, wherein the breakpoint determinator is further configured to determine the breakpoints based on:

$$\vec{m}^* = \operatorname*{argmin}_{\vec{m}} \left[ \sum_{j=1}^{M} \sum_{k} w_k \min_{\vec{y}_j^k} \left\| \vec{x}_j^k(\vec{m}) - A_j(\vec{m}) \vec{y}_j^k \right\|_P^2 \right]$$

where $\vec{m}^*$ denotes a best choice of breakpoints that minimize the sum of square errors; $x_n^k$ denotes a set of K time series $x_n^k$ for n=1, ..., N and k=1, ..., K with time, n, separated into M partitions with breakpoints at $m_0(=0)$, $m_1, \ldots, m_{M-1}$, $m_M = N$; $\vec{m}$ denotes all possible breakpoints; $\vec{y}_j^k$ denotes an unknown vector to be determined defining trends between any two consecutive breakpoints; and P denotes importance of a data point and w denotes inportance of a data set.

25. The system of claim 19, wherein a set of optimal breakpoints are calculated based on:

$$\vec{y}_j^{k*} = (A_j^T(\vec{m}) P A_j(\vec{m}))^{-1} A_j^T(\vec{m}) P \vec{x}_j^k$$

wherein $\vec{y}_j^{k*}$ denotes a best choice of $\vec{y}_j^k$ defined in claim 24.

26. The system of claim 19, wherein the trend identifier further comprises:
a mood forecaster, configured to forecast future mood shifts of the social media users based on previous breakpoints determined from historic textual messages.

27. The system of claim 26, wherein the mood forecaster is further configured to extend a derived trend line from a most recent breakpoint to determine a forecasted value.

28. The system of claim 26, wherein the mood forecaster is further configured to extend a derived trend line from a most recent breakpoint with a horizontal slope to determine a forecasted value.

29. The system of claim 19, wherein the breakpoint determinator is further configured to determine the breakpoints based on a Dth degree polynominal model, wherein the score for each word category is modeled as a Dth degree polynominal within a breakpoint region.

30. The system of claim 19, wherein the breakpoint determinator is further configured to determine the breakpoints based on a finite parameter model, wherein the score for each word category is modeled as a finite parameter within a breakpoint region.

31. The system of claim 19, where in the score calculator is further configured to calculate a ratio of number of words in the textual messages falling into the word category to a total number of words in the textual messages.

32. The system of claim 19, wherein the textual messages are short messages generated from tweet and other social media.

33. The system of claim 19, wherein the textual messages are generated from sources other than social media.

34. A non-transitory computer-readable medium storing software comprising instructions executable by one or more computers which, upon such execution, cause the one or more computers to perform operations comprising:
categorizing textual messages generated from the social media users over a selected period of time into a plurality of word categories, wherein each word category contains a set of words associated with the mood of social media users;
for each Word category, calculating a score representing an intensity of the mood of the social media users, wherein a value of the score and its corresponding time point define a data point for the word category;
determining breakpoints in the mood of social media users that minimize a sum of square errors representing a measurement of a consistency of all data points from inferred values of the scores of the data points derived using the breakpoints over the selected period of time, wherein space of all possible breakpoints for the word categories are searched to identify a defined number and locations of the breakpoints; and
interpreting the breakpoints over the selected period of time to identify the shifts in the mood of social media users and the trends between the breakpoints.

* * * * *